Nov. 20, 1951     G. W. HARDIGG     2,575,710
APPARATUS FOR MEASURING ROTOR BLADE VIBRATION
Filed Dec. 9, 1949
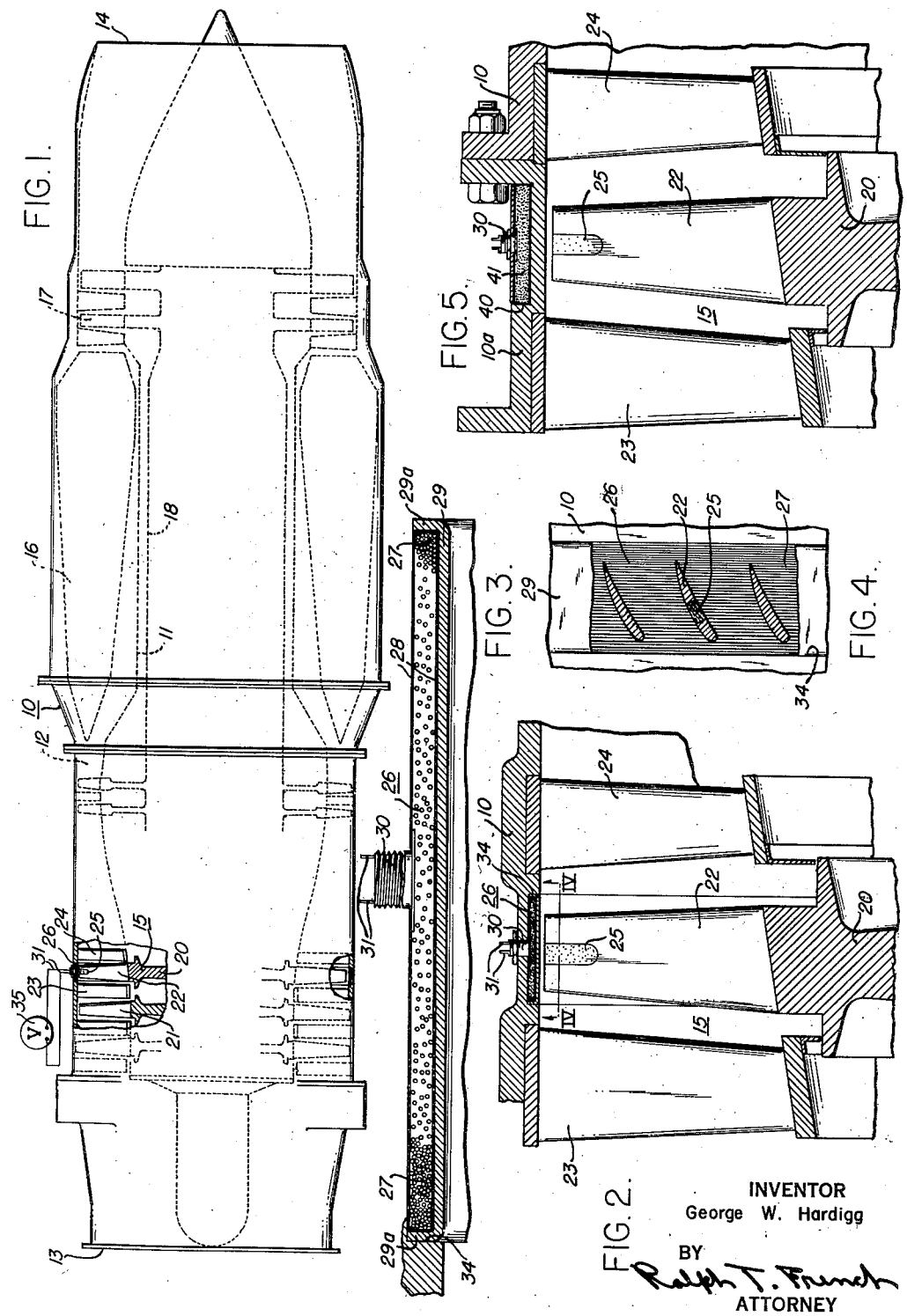
INVENTOR
George W. Hardigg
BY
Ralph T. French
ATTORNEY Patented Nov. 20, 1951

2,575,710

UNITED STATES PATENT OFFICE 2,575,710

APPARATUS FOR MEASURING ROTOR BLADE VIBRATION

George W. Hardigg, Swarthmore, Pa., assignor to Westinghouse Electric Corporation, East Pittsburgh, Pa., a corporation of Pennsylvania Application December 9, 1949, Serial No. 132,157

6 Claims. (Cl. 73—70)

This invention relates to blading for axial flow compressors or turbines, and more particularly to means for detecting and measuring blade vibration.

In the development and improvement of rotary compressors, turbines and the like, it is frequently desirable to investigate and measure the vibration characteristics of blading for the rotor of the machine. Methods heretofore proposed have involved complicated and costly apparatus, due in part to the difficulty of transferring a vibration indicating signal, either optical or electrical, from a high speed rotating part to a stationary recording instrument.

It is an object of the present invention to provide improved electro-responsive test apparatus of relatively inexpensive construction serving to obviate the aforesaid difficulty.

It is another object of the invention to provide electrical means for detecting vibration of a rotating compressor or turbine blade which is readily adapted to facilitate study of blade vibration characteristics of the turbo-compressor rotor of a gas turbine power plant.

Another object is the provision of means for facilitating investigation of vibratory stresses on a rotating blade by production of a measurable electrical characteristic determined according to the magnitude and frequency of blade vibration.

Features of the invention include the disposal of an annular coil in encompassing relation with a rotating blade carrying a magnet, the windings of the coil being disposed parallel to the plane of rotation of the blade, together with means for determining the voltage output of the coil produced by the axial component of vibration of the blade, and resulting from the shifting of the magnetic lines of force across the coil windings.

These and other objects are effected by my invention as will be apparent from the following description and claims taken in connection with the accompanying drawings, forming a part of this application, in which:

Fig. 1 is a diagrammatic elevational view, partly sectioned, of a typical gas turbine power plant having a multi-stage compressor and equipped with one form of blade vibration detection apparatus constructed in accordance with the invention;

Fig. 2 is an enlarged detail, sectional, fragmentary view of a blade and the associated testing components of the vibration detection apparatus shown in Fig. 1;

Fig. 3 is a diagrammatic sectional view, in enlarged detail, of a portion of the coil of the equipment shown in Fig. 2;

Fig. 4 is a fragmentary sectional view in schematic form taken substantially along the line IV—IV of Fig. 2; and Fig. 5 is a fragmentary sectional view somewhat similar to Fig. 2 but illustrating a modified form of the invention.

Referring to Fig. 1 of the drawing, the typical aviation gas turbine engine therein disclosed comprises an outer substantially cylindrical casing structure 10, an interiorly disposed sectional core structure generally indicated at 11, forming an annular flow passage 12 extending from a frontal air inlet opening 13 to a rearwardly directed nozzle 14, and operating elements arranged in line and including an axial flow compressor 15, combustor apparatus 16, and a turbine 17, which is connected to the compressor by a common shaft 18. The general principles of operation of such a power plant are well known, and may be briefly summarized as follows: air entering the inlet opening 13 is delivered under pressure from the compressor 15 to the combustion apparatus 16 for supporting combustion of fuel supplied thereto by way of suitable nozzles (not shown), and the heated motive gases thus provided are then expanded through the turbine 17 and finally discharged to the atmosphere by way of the nozzle 14 for producing a propulsive thrust.

The compressor 15 is of the axial flow type and comprises a rotor 20 carrying a plurality of longitudinally spaced stages or annular rows of radially arranged blades, including second and third stage blades indicated by the reference characters 21 and 22, respectively. Interposed between the separate stages of compressor blades are the usual stationary annular diaphragm assemblies, each of which comprises a plurality of radially disposed vanes, such as those indicated at 23 and 24 mounted on opposite sides of the rotary blades 22. It will here be assumed that one of the blades 22 of the third compressor stage is selected for testing.

According to the invention, the tip of the blade 22 to be tested is provided with a permanent magnet portion 25, as best shown in Fig. 2. Preferably, a slot is milled in the tip of the blade 22 for receiving the magnet portion 25 which is formed of a suitable nickle steel alloy having favorable magnetic qualities, and is secured in place by brazing, ground to the desired blade contour, and magnetized.

In order to effect measurement of vibration of the blade 22 thus prepared, a circumferential coil 26 is provided in the form of a thin annular series of windings of insulated wire disposed parallel to the plane of rotation of the blade stage. In the embodiment shown in Fig. 3, the coil 26 comprises a plurality of concentric turns of relatively fine gauge enameled wire 27 encased in a sheath 28 of glass fibre cloth and carefully wound on a thin flat channel member 29 having annular side flanges 29a, which may be formed of spun aluminum. The turns of wire 27 may be bonded with a suitable plastic or silicone varnish. A small threaded plug 30 of an insulating or plastic material is cemented to the coil 26 for carrying the lead wire or terminals 31 thereof, and for facilitating the securing of the coil into the casing structure of the machine to be tested.

The coil 26 is mounted in an annular recess 34 formed in the interior wall of the casing structure 10 housing the compressor 15, at a point radially outward of the third stage of blading 22, which includes the blade equipped with the magnet tip portion 25. It will thus be seen that the blade 22 housing the magnet portion 25 is adapted to be rotated concentrically within the coil 26, the windings of which are disposed parallel to the plane of rotation, while the blade 22 is set at an angle relative to the plane of rotation, as indicated diagrammatically in Fig. 4. Any suitable means for indicating electrical characteristics developed in the coil 26 may be connected to the terminals 31 thereof, such as an electronic milli-voltmeter 35 shown diagrammatically in Fig. 1. It will be apparent that additional instruments, such as an oscilloscope may readily be employed in accordance with the test data desired.

It will be understood that rotation of the blade 22 carrying magnet portion 25 will normally be effected without generating any potential in the coil 26, since the windings thereof are aligned with the revolving magnet. Upon vibration of the angularly set blade 22, however, the component of motion perpendicular to the plane of rotation becomes effective to cause the magnetic field around the magnet portion 25 to oscillate through the windings of the coil 26, generating an electromotive force that is proportional to the frequency of the blade tip. By calibrating the apparatus and running tests under different operational conditions, the magnitude and frequency of blade vibration, and the relationship thereof to other characteristics of engine operation, as indicated by the output of the coil 26, can readily be determined with accuracy and at relatively low expense. It will of course be understood that other blades in all of the various stages of the machine may be studied by provision of similar apparatus disposed at corresponding points.

Referring to Fig. 5 of the drawing, a modified form of coil structure may be employed, if it is desired to provide a readily demountable structure, comprising a separable annular casing section 10a adapted to be secured in the casing structure 10, which should be constructed of a non-magnetic material such as aluminum, in encompassing relation with the blade 22 carrying the magnet portion 25 and having an outer annular recess 40 adapted to receive a concentrically wound coil 41. The coil 41 may be substantially similar in construction to the coil 26 already described, and exhibits features of accessibility and permanent protection from the possibly damaging action of fluid flowing over the blades of the machine during operation. Testing of the blading with the apparatus shown in Fig. 5 may be accomplished in the same manner as already described in connection with the equipment shown in Fig. 2.

While I have shown my invention in several forms, it will be obvious to those skilled in the art that it is not so limited, but is susceptible of various other changes and modifications without departing from the spirit thereof.

What I claim is:

1. Test apparatus for determining magnitude and frequency of vibration induced in a blade mounted on the rotor of a turbine or compressor, comprising a magnet element carried on the tip of said blade, an annular coil mounted in close concentric encompassing relation with respect to the rotor carrying said blade, the windings of said coil being disposed parallel to and substantially in the plane of rotation of said blade, and electroresponsive means for measuring the output of said coil which reflects the axial component of movement of said magnet in directions parallel to the rotor axis during vibration of the blade.

2. Test apparatus for determining magnitude and frequency of vibration induced in a blade mounted on the rotor of a turbine or compressor, comprising cylindrical casing structure containing said rotor and having an annular recess formed therein in close circumferential proximity to the path of the tip of said blade, a magnet element carried on the tip of said blade, an annular coil mounted in said recess and having windings disposed parallel to and substantially in the plane of rotation of said blade, and electroresponsive means for measuring the output of said coil reflecting axial movement of said magnet in directions parallel to the rotor axis due to vibration of said blade.

3. Electrical apparatus for detecting vibration of a blade having a magnetized portion and operative in a rotational path, comprising an annular pickup coil having concentric windings disposed in parallel planes, a sheath of glass fibre cloth encasing said coil, a rigid annular member formed of thin non-magnetic material and having lateral flanges for receiving and supporting said encased coil in circumferential coplanar relation with respect to said rotational path of the blade, and electroresponsive means for indicating the output potential developed in said coil in the event of transverse movement of said blade relative to its plane of rotation.

4. An electroresponsive pickup coil for detecting transverse vibratory motion of a blade having a magnetized portion and operative in a rotational path, comprising a plurality of concentric annular windings of insulated wire disposed in parallel planes, a sheath of glass fibre cloth encasing said windings, and a rigid annular support member formed of thin non-magnetic material and having radially outwardly projecting lateral flanges for receiving said encased coil, said support member being concentrically interposed between said sheathed windings and the tip of said blade.

5. Test apparatus for determining magnitude and frequency of vibration induced in a blade mounted on the rotor of a turbine or compressor, comprising cylindrical casing structure containing said rotor and having an annular recess formed therein in close circumferential proximity to the path of the tip of said blade, a magnet element brazed in the tip portion of said blade, and an annular coil mounted in said recess, said coil including a plurality of windings of wire disposed radially outwardly of said blade and parallel to the plane of rotation of said blade, and a non-magnetic annular supporting element interposed between said windings and said blade.

6. Test apparatus for determining magnitude and frequency of vibration induced in a blade mounted on the rotor of a turbine or compressor, comprising a magnet carried in the tip of said blade, a cylindrical casing section encompassing said blade path and having an outer annular recess formed radially outwardly of said path, and an annular coil including a plurality of windings disposed in said recess in parallel relation with respect to the plane of rotation of said blade, whereby axial vibratory motion of said blade tip and magnet in directions parallel to the rotational axis will induce a corresponding electrical potential in said windings.

GEORGE W. HARDIGG.

REFERENCES CITED

The following references are of record in the file of this patent:

UNITED STATES PATENTS

| Number | Name | Date |
| --- | --- | --- |
| 1,640,464 | Mershon | Aug. 30, 1927 |
| 1,823,326 | Legg | Sept. 15, 1931 |
| 2,204,425 | Mershon | June 11, 1940 |